United States Patent [19]

Jolley et al.

[11] Patent Number: 5,008,028

[45] Date of Patent: Apr. 16, 1991

[54] LIQUID COMPOSITIONS CONTAINING CARBOXYLIC ESTERS

[75] Inventors: Scott T. Jolley, Mentor; Arturs Grava, Mayfield Heights, both of Ohio

[73] Assignee: The Lubrizol Corporation, Wickliffe, Ohio

[21] Appl. No.: 559,525

[22] Filed: Jul. 19, 1990

Related U.S. Application Data

[63] Continuation of Ser. No. 284,315, Dec. 14, 1988, abandoned.

[51] Int. Cl.$^5$ ................................................. C09K 5/04
[52] U.S. Cl. ................................ 252/68; 252/51.5 R; 252/54.6; 252/56 R; 252/56 S
[58] Field of Search ............... 252/68, 51.5 R, 54.6, 252/56 R, 56 S

[56] References Cited

U.S. PATENT DOCUMENTS

| | | | |
|---|---|---|---|
| 2,040,904 | 5/1936 | Zellhoefer | 252/5 |
| 2,040,905 | 5/1936 | Zellhoefer | 252/5 |
| 3,894,959 | 7/1975 | Gardiner et al. | 252/69 |
| 4,248,726 | 2/1981 | Uchinuma et al. | 252/52 A |
| 4,267,064 | 5/1981 | Sasaki et al. | 252/52 A |
| 4,428,854 | 1/1984 | Enjo et al. | 252/69 |
| 4,431,557 | 2/1984 | Shimizi et al. | 252/52 A |
| 4,454,052 | 6/1984 | Shoji et al. | 252/68 |
| 4,455,247 | 6/1984 | Nakayama et al. | 252/67 |
| 4,559,154 | 12/1985 | Powell | 252/69 |
| 4,755,316 | 7/1988 | Magid et al. | 252/68 |
| 4,900,463 | 2/1990 | Thomas et al. | 252/68 |
| 4,959,169 | 9/1990 | McGraw et al. | 252/68 |

FOREIGN PATENT DOCUMENTS

| | | |
|---|---|---|
| 0030127 | 10/1981 | European Pat. Off. . |
| 0062516 | 2/1982 | European Pat. Off. . |
| 7125210 | 8/1965 | Japan ................................ 252/58 |

OTHER PUBLICATIONS

Patent Abstracts of Japan, vol. 11, No. 80 (Abstract of Japanese Patent No. 61-233087).

*Primary Examiner*—Prince E. Willis
*Assistant Examiner*—Jerry D. Johnson
*Attorney, Agent, or Firm*—Robert A. Franks; Frederick D. Hunter; Forrest L. Collins

[57] ABSTRACT

A liquid composition is described which comprises
(A) a major amount of a fluorine containing hydrocarbon containing one or two carbon atoms, and
(B) a minor amount of a soluble organic lubricant comprising at least one carboxylic ester compound characterized by the formulae $$RO(R^1O)_nC(O)R^2 \qquad (I)$$

and $$R^3OC(O)R^2 \qquad (II)$$

wherein R is a hydrocarbyl group of at least 2 carbon atoms,
  $R^1$ is a hydrocarbylene group,
  $R^2$ is H, hydrocarbyl, $-CF_3$, $-R^4CN$, $R^4$-$NO_2$ or $R^5OCH(R^6)$-,
  $R^3$ is a $-R^4CF_3$, $R^4CN$ or $-R^4NO_2$ group, provided that $R^3$ may be a hydrocarbyl group when $R^2$ is $-R^4CN$,
  n is an integer from 1 to about 50,
  $R^4$ is a hydrocarbylene group,
  $R^5$ is H, a lower hydrocarbyl group or $R^7C(O)$- where $R^7$ is a hydrocarbyl group, and
  $R^6$ is H or a lower hydrocarbyl group.

Liquid compositions also are described containing fluorine-containing hydrocarbons also containing other halogen such as chlorine. The liquid compositions are useful particularly as refrigeration liquids in refrigerators and air-conditioners including auto, home and industrial air-conditioners.

30 Claims, No Drawings

LIQUID COMPOSITIONS CONTAINING CARBOXYLIC ESTERS

This is a continuation of copending application Ser. No. 07/284,315 filed on Dec. 14, 1988 now abandoned.

FIELD OF THE INVENTION

This invention relates to liquid compositions comprising a major amount of a fluorine-containing hydrocarbon, and a minor amount of a lubricant. More particularly, the invention relates to liquid compositions useful as refrigeration liquids.

BACKGROUND OF THE INVENTION

Chlorofluorocarbons, generally referred to in the industry as CFCs, have been widely used as propellants, in aerosols, although use in aerosols has been diminishing in recent years because of demands of environmentalists for the reduction if not a complete ban on the use of CFCs because of the detrimental effect of CFCs on the atmosphere's ozone layer. CFCs also have been used because of their unique combination of properties as refrigerants, foam-blowing agents, and specialty solvents within the electronics and aerospace industries. Examples of CFCs which have been utilized for these purposes include CFC-11 which is chlorotrifluoromethane, CFC-12 which is dichlorodifluoromethane, and CFC-113 which is 1,2,2-trifluoro-1,1,2-trichloroethane.

Since 1976, when the aerosol industry began to feel the pressure to reduce if not eliminate the use of CFCs, the aerosol industry has progressively moved toward the substitution of hydrocarbon propellants for CFC propellants. The hydrocarbons, such as butane, are readily available and inexpensive, and the quality of the final product generally has been unaffected by the substitution of propellants. However, the problem of finding a safe replacement of CFC refrigerants and foam-blowing agents has been more difficult to solve. Several replacement candidates have been suggested as alternatives to the fully halogenated hydrocarbons, and these include halogenated hydrocarbons containing at least some hydrogen atoms such as HCFC-22 which is difluorochloromethane, HCFC-123 which is 1,1-dichloro-2,2,2-trifluoroethane, HFC-134a which is 1,1,1,2-tetrafluoroethane and HCFC-141b which is 1,1-dichloro-1-fluoroethane.

The ozone depletion potential of these proposed substitutes is significantly less than the ozone depletion potential of the previously used CFCs. The ozone depletion potential is a relative measure of the capability of the material to destroy the ozone layer in the atmosphere. It is a combination of the percentage by weight of chlorine (the atom that attacks the ozone molecule) and the lifetime in the atmosphere. HCFC-22 and HFC-134a generally are recommended as being candidates in refrigerant applications, and HFC-134a is particularly attractive because its ozone depletion potential has been reported as being zero.

In order for any of the replacement materials to be useful as refrigerants, the materials must be compatible with the lubricant utilized in the compressor. The presently used refrigerants such as CFC-12 are readily compatible with mineral lubricating oils which are utilized as the lubricant in air-conditioner compressors. The above-described refrigerant candidates, however, have different solubility characteristics than the refrigerants presently in use. For example, mineral lubricating oil is incompatible (i.e., insoluble) with HFC134a. Such incompatibility results in unacceptable compressor life in compression-type refrigeration equipment including refrigerators and air-conditioners including auto, home and industrial air-conditioners. The problem is particularly evident in automotive air-conditioning systems since the compressors are not separately lubricated, and a mixture of refrigerant and lubricant circulates throughout the entire system.

In order to perform as a satisfactory refrigeration liquid, the mixture of refrigerant and lubricant must be compatible and stable over a wide temperature range such as from about 0° C. and above 80° C. It is generally desirable for the lubricants to be soluble in the refrigerant at concentrations of about 5 to 15% over a temperature range of from −40° C. to 80° C. These temperatures generally correspond to the working temperatures of an automobile air-conditioning compressor. In addition to thermal stability, the refrigeration liquids must have acceptable viscosity characteristics which are retained even at high temperatures, and the refrigeration liquid should not have a detrimental effect on materials used as seals in the compressors.

Compositions comprising a tetrafluoroethane and polyoxyalkylene glycols are discussed in U.S. Pat. No. 4,755,316. The compositions are useful in refrigeration systems. Refrigeration oils are described in U.S. Pat. Nos. 4,248,726 and 4,267,064 which comprise mixtures of a polyglycol and 0.1 to 10% of glycidyl ether type epoxy compounds, or epoxidized fatty acid monoesters, and optionally, epoxidized vegetable oil. The lubricating oils are reported to be useful in refrigerators using a halogen-containing refrigerant such as Freons 11, 12, 13, 22, 113, 114, 500 and 502 (available from DuPont), and in particular with Freon 12 or 22.

U.S. Pat. No. 4,431,557 describes fluid compositions comprised of a fluoro- and chloro-containing refrigerant, a hydrocarbon oil, and an alkylene oxide additive compound which improves the thermal resistance of the oil in the presence of the refrigerant. Examples of hydrocarbon oils include mineral oil, alkyl benzene oil, dibasic acid ester oil, polyglycols, etc. The composition may contain other additives including load-carrying additives such as phosphorus acid esters, phosphoric acid esters, etc. Examples of fluorocarbon refrigerants include R-11, R-12, R-113, R-114, R-500, etc.

U.S. Pat. No. 4,428,854 describes absorption refrigerant compositions for use in refrigeration systems comprising 1,1,1,2-tetrafluoroethane and an organic solvent capable of dissolving the ethane. Among the solvents disclosed are organic amides, acetonitrile, N-methyl pyrroles, N-methyl pyrrolidine, N-methyl-2-pyrrolidone, nitromethane, various dioxane derivatives, glycol ethers, butyl formate, butyl acetate, diethyl oxalate, diethyl malonate, acetone, methyl ethyl ketone, other ketones and aldehydes, triethyl phosphoric triamide, triethylene phosphate, triethyl phosphate, etc.

Stabilized absorption compositions comprising (a) a halogenated hydrocarbon refrigerant, (b) a liquid absorbent of a polyethylene glycol methyl ether, and (c) at least one stabilizer are described in U.S. Pat. No. 4,454,052. Examples of stabilizers include phosphate esters, epoxy compounds, and organotin compounds. The polyethylene glycol methyl ether-type compounds are of the general formula

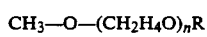

wherein n is an integer of 1 to 6, and R is H, CH$_3$- or CH$_3$CO-. A variety of halogenated hydrocarbons are described including 1,1,-difluoromethane, 1,1,1,2-tetrafluoroethane, etc.

U.S. Pat. No. 4,559,154 relates to absorption heat pumps utilizing as working fluid, a saturated fluorohydrocarbon or fluorohydrocarbon ether having from 3 to 5 carbon atoms. Solvents reported to be useful with such fluorohydrocarbons include ethers such as tetraglyme, amides which can be lactams such as the N-alkyl pyrrolidones, sulfonamides and ureas including cyclic ureas.

SUMMARY OF THE INVENTION

A liquid composition is described which comprises
(A) a major amount of a fluorine containing hydrocarbon containing one or two carbon atoms, and
(B) a minor amount of a soluble organic lubricant comprising at least one carboxylic ester compound characterized by the formulae $$RO(R^1O)_nC(O)R^2 \qquad (I)$$

and $$R^3OC(O)R^2 \qquad (II)$$

wherein R is a hydrocarbyl group of at least 2 carbon atoms,
R$^1$ is a hydrocarbylene group,
R$^2$ is H, hydrocarbyl, -CF$_3$, -R$^4$CN, -R$^4$- NO$_2$ or R$^5$OCH(R$^6$)-,
R$^3$ is a -R$^4$CF$_3$, -R$^4$CN or -R$^4$NO$_2$ group, provided that R$^3$ may be a hydrocarbyl group when R$^2$ is -R$^4$CN,
n is an integer from 1 to about 50,
R$^4$ is a hydrocarbylene group,
R$^5$ is H, a lower hydrocarbyl group or R$^7$C(O)- where R$^7$ is a hydrocarbyl group, and
R$^6$ is H or a lower hydrocarbyl group. The lubricants are preferably free of acetylenic and aromatic unsaturation. Liquid compositions also are described containing fluorine-containing hydrocarbons also containing other halogen such as chlorine. The liquid compositions are useful particularly as refrigeration liquids in refrigerators and air-conditioners including auto, home and industrial air-conditioners.

DESCRIPTION OF THE PREFERRED EMBODIMENTS

Throughout this specification and claims, all parts and percentages are by weight, temperatures are in degrees Celsius, and pressures are at or near atmospheric unless otherwise clearly indicated.

As used in this specification and in the appended claims, the terms "hydrocarbyl" and "hydrocarbylene" denote a group having a carbon atom directly attached to the polar group and having a hydrocarbon or predominantly hydrocarbon character within the context of this invention. Such groups include the following:

(1) Hydrocarbon groups; that is, aliphatic, (e.g., alkyl or alkenyl), alicyclic (e.g., cycloalkyl or cycloalkenyl), and the like, as well as cyclic groups wherein the ring is completed through another portion of the molecule (that is, any two indicated substituents may together form an alicyclic group). Such groups are known to those skilled in the art. Examples include methyl, ethyl, octyl, decyl, octadecyl, cyclohexyl, etc.

(2) Substituted hydrocarbon groups; that is, groups containing non-hydrocarbon substituents which, in the context of this invention, do not alter the predominantly hydrocarbon character of the group. Those skilled in the art will be aware of suitable substituents. Examples include halo, hydroxy, alkoxy, etc.

(3) Hetero groups; that is, groups which, while predominantly hydrocarbon in character within the context of this invention, contain atoms other than carbon in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbyl group.

Terms such as "alkyl", "alkylene", etc. have meanings analogous to the above with respect to hydrocarbyl and hydrocarbylene.

The term "hydrocarbon-based" also has the same meaning and can be used interchangeably with the term hydrocarbyl when referring to molecular groups having a carbon atom attached directly to the polar group.

The term "lower" as used herein in conjunction with terms such as hydrocarbyl, alkyl, alkenyl, alkoxy, and the like, is intended to describe such groups which contain a total of up to 7 carbon atoms.

(A) Fluorine-Containing Hydrocarbon

The liquid compositions of the present invention comprise a major amount of a fluorine-containing hydrocarbon. That is, the fluorine-containing hydrocarbons contain at least one C-H bond as well as C-F bonds. In addition to these two essential types of bonds, the hydrocarbon also may contain other carbon-halogen bonds such as C-Cl bonds. Because the liquid compositions of the present invention are primarily intended for use as refrigerants, the fluorine-containing hydrocarbon preferably contains one or two carbon atoms, and more preferably two carbon atoms.

As noted above, the fluorine-containing hydrocarbons useful in the liquid compositions of the present invention may contain other halogens such as chlorine. However, in one preferred embodiment, the hydrocarbon contains only carbon, hydrogen and fluorine. These compounds containing only carbon, hydrogen and fluorine are referred to herein as fluorohydrocarbons. The hydrocarbons containing chlorine as well as fluorine and hydrogen are referred to as chlorofluorohydrocarbons. The fluorine-containing hydrocarbons useful in the composition of the present invention are to be distinguished from the fully halogenated hydrocarbons which have been and are being used as propellants, refrigerants and blowing agents such as CFC-11, CFC-12 and CFC-113 which have been described in the background.

Specific examples of the fluorine-containing hydrocarbons useful in the liquid compositions of the present invention, and their reported ozone depletion potentials are shown in the following Table I.

TABLE I

| Compound Designation | Formula | ODP* |
|---|---|---|
| HCFC-22 | CHClF$_2$ | 0.05 |

TABLE I-continued

| Compound Designation | Formula | ODP* |
|---|---|---|
| HCFC-123 | CHCl$_2$CF$_3$ | <0.05 |
| HCFC-141b | CH$_3$CCl$_2$F | <0.05 |
| HFC-134a | CH$_2$FCF$_3$ | 0 |

*Ozone depletion potential as reported in Process Engineering, pp. 33-34, July, 1988.

Examples of other fluorine-containing hydrocarbons which may be useful in the liquid compositions of the present invention include trifluoromethane, 1,1,1-trifluoroethane, 1,1-difluoroethane, and 1,1,2,2-tetrafluoroethane.

In general, fluorine-containing hydrocarbons which are useful as refrigerants are fluoromethanes and fluoroethanes boiling at a relatively low temperature at atmospheric pressure, e.g., below 30° C. The useful fluorocarbon refrigerants serve to transfer heat in a refrigeration system by evaporating and absorbing heat at a low temperature and pressure, e.g., at ambient temperature and atmospheric pressure, and by releasing heat on condensing at a higher temperature and pressure.

The liquid compositions of the present invention contain a major amount of the fluorine-containing hydrocarbon. More generally, the liquid compositions will comprise from about 50% to about 99% by weight of the fluorine-containing hydrocarbon. In another embodiment, the liquid compositions contain from about 70% to about 99% by weight of the fluorine-containing hydrocarbon.

(B) Soluble Organic Lubricant

In addition to the fluorine-containing hydrocarbon, the liquid compositions of the present invention contain a minor amount of a soluble organic lubricant which is preferably free of acetylenic and aromatic unsaturation and comprises at least one carboxylic ester compound characterized by the following formulae $$RO(R^1O)_nC(O)R^2 \qquad (I)$$

and $$R^3OC(O)R^2 \qquad (II)$$

wherein R is a hydrocarbyl group of at least 2 carbon atoms,
$R^1$ is a hydrocarbylene group,
$R^2$ is H, hydrocarbyl, -CF$_3$, -R$^4$CN, -R$^4$-NO$_2$, or R$^5$OCH(R$^6$)-,
$R^3$ is a -R$^4$CF$_3$, -R$^4$CN or -R$^4$NO$_2$ group, provided that $R^3$ may be a hydrocarbyl group when $R^2$ is -R$^4$CN,
n is an integer from 1 to about 50,
$R^4$ is a hydrocarbylene group,
$R^5$ is H, a lower hydrocarbyl group or R$^7$C(O)- where R$^7$ is a hydrocarbyl group, and
$R^6$ is H or a lower hydrocarbyl group.

In the above Formulae I and II, R is a hydrocarbyl group of at least 2 carbon atoms and more particularly is an alkyl group containing from 2 to about 50 carbon atoms. Branched-chain alkyl groups are particularly useful as R groups since the presence of the branching appears to improve the solubility of the lubricant in the fluorine-containing hydrocarbon. Examples of R groups include ethyl, propyl, butyl, hexyl octyl, decyl, dodecyl, tridecyl, hexadecyl, octadecyl, higher alkyl groups, and mixtures of one or more of these. $R^1$ is a hydrocarbylene group preferably containing from 1 to about 7 carbon atoms. Alkylene groups such as methylene, ethylene, propylene, 2-methyl ethylene, 2-ethyl ethylene, etc., are examples of hydrocarbylene groups useful as $R^1$. When $R^2$ is a hydrocarbyl group, $R^2$ generally will contain from 1 to about 20 carbon atoms and more often will be a lower alkyl group such as methyl, ethyl, propyl, butyl, etc.

$R^2$ in Formulae I and II also may be hydrogen, -CF$_3$, -R$^4$CN, -R$^4$NO$_2$ or R$^5$OCH(R$^6$)- wherein R$^4$ is a hydrocarbylene group, preferably an alkylene group, R$^5$ is a lower hydrocarbyl group or R$^7$C(O) wherein R$^7$ is a hydrocarbyl group, and R$^6$ is H or a lower hydrocarbyl group. The hydrocarbylene group R$^4$, in one embodiment, is an alkylene group containing from 1 to about 20 carbon atoms, and the alkylene group may be straight chain or branched chain. R$^5$ may be a lower hydrocarbyl group, and specific examples of such groups include methyl, ethyl, propyl, etc. R$^7$ is a hydrocarbyl group which may contain from 1 to about 20 carbon atoms, and in one embodiment this hydrocarbyl group also is a lower hydrocarbyl group.

The compositions represented by Formula I may be prepared by techniques well known in the art. In one embodiment, esters of the type represented by Formula I are prepared by the reaction of a carboxylic acid R$^2$COOH (or its anhydride) with an alkoxy alcohol such as represented by the formula $$RO(R^1O)_nH \qquad (III)$$

wherein R, R$^1$ and n are as defined above with respect to Formula I. In one embodiment, R$^1$ is a branched-chain hydrocarbylene group containing 3, 4, or 5 carbon atoms. For example R$^1$ may be a methyl- or ethyl-substituted ethylene group derived from propylene oxide or butylene oxide.

The carboxylic acid, R$^2$COOH, which may be reacted with the alkoxy alcohol (III) can be any of the carboxylic acids wherein R$^2$ is H, hydrocarbyl, -CF$_3$, -R$^4$CN, -R$^4$NO$_2$, or R$^5$OCH(R$^6$)- wherein R$^4$, R$^5$ and R$^6$ are as defined above with respect to Formulae I and II. The following examples will illustrate the various types of carboxylic acids exemplified by the formula R$^2$COOH and some anhydrides of such acids: formic acid, acetic acid, acetic anhydride, propionic acid, trifluoroacetic acid, trifluoroacetic acid anhydride, cyanoacetic acid, cyanoundecanoic acid, nitroacetic acid, 3-nitropropionic acid, glycolic acid, lactic acid, methoxyacetic acid, ethoxyacetic acid, acetylacetic acid, etc.

A variety of alkoxy alcohols of the type represented by the above Formula III are known in the art, and many are available commercially. The alkoxy alcohols are produced generally by treating an aliphatic alcohol such as a fatty alcohol with an excess of an alkylene oxide such as ethylene oxide or propylene oxide. For example, from about 6 to about 40 moles of ethylene oxide or propylene oxide may be condensed with the aliphatic alcohol.

In one embodiment, the aliphatic alcohol contains from about 14 to about 24 carbon atoms and may be derived from long chain fatty alcohols such as oleyl alcohol or stearyl alcohol.

The alkoxy alcohols useful in the reaction with the carboxylic acids or anhydrides to prepare esters of the type represented by Formula I are available commercially under such trade names as "TRITON®" from Rohm & Haas Company, "TERGITOL®" from Union Carbide, "ALFONIC®" from Conoco Chemicals Company, and "NEODOL®" from Shell Chemical Company. The TRITON® materials are identified generally as polyethoxylated alcohols which may be derived from straight chain or branched chain alcohols. The TERGITOLS® are identified as polyethylene glycol ethers of primary or secondary alcohols; the ALFONIC® materials are identified as ethoxylated linear alcohols which may be represented by the general structural formula $$CH_3(CH_2)_xCH_2(OCH_2CH_2)_nOH \qquad (IV)$$

wherein x varies between 4 and 16 and n is a number between about 3 and 11. Specific examples of ALFONIC® ethoxylates characterized by the above formula include ALFONIC® 1012-60 wherein x is about 8 to 10 and n is an average of about 5.7; ALFONIC® 1214-70 wherein x is about 10–12 and n is an average of about 10.6; ALFONIC® 1412-60 wherein x is from 10–12 and n is an average of about 7; and ALFONIC® 1218-70 wherein x is about 10–16 and n is an average of about 10.7.

The NEODOL® ethoxylates are ethoxylated alcohols wherein the alcohols are a mixture of alcohols containing from 12 to about 15 carbon atoms, and the alcohols are branched chain primary alcohols. The ethoxylates are obtained by reacting the alcohols with an excess of ethylene oxide such as from about 3 to about 12 or more moles of ethylene oxide per mole of alcohol. For example, NEODOL® ethoxylate 23-6.5 is a branched chain alcoholate of 12 to 13 carbon atoms with an average of about 6.5 ethoxy units.

The lubricants (B) utilized in the liquid composition of the present invention also may be characterized by the following formula $$R^3OC(O)R^2 \qquad (II)$$

wherein $R^2$ is H, hydrocarbyl, hydrocarbyloxy hydrocarbyl, $-CF_3$, $-R^4CN$, $-R^4NO_2$ or $R^5OCH(R^6)-$, and $R^3$ is a $-R^4CF_3$, $-R^4CN$ or $-R^4NO_2$ group wherein $R^4$, $R^5$ and $R^6$ are as defined in Formula I, provided that $R^3$ may be a hydrocarbyl group when $R^2$ is $-R^4CN$. Such carboxylic esters can be prepared by techniques known in the art such as, for example, by the reaction of a carboxylic acid, $R^2COOH$, as described above, or the anhydride of said acid with hydroxy-containing compounds such as the following:

$$R^3OH \qquad (V)$$

$$HOR^4CN \qquad (VI)$$

$$HOR^4NO_2 \qquad (VII)$$

$$HOR^4CF_3 \qquad (VIII)$$

wherein $R^4$ is a hydrocarbylene group. In one embodiment, $R^4$ is a straight chain or branched chain alkylene group, containing from about 1 to 20 carbon atoms and more particularly, from 1 to about 10 carbon atoms.

As noted above, $R^3$ in Formula II may be a hydrocarbyl group when $R^2$ is $-R^4CN$. The hydrocarbyl group may contain from 1 to 20 or more carbon atoms and is preferably a branched-chain alkyl group containing from 3 to about 20 carbon atoms. Esters characterized by Formula II and $R^3$ as a hydrocarbyl group are prepared by reacting the carboxylic acid ($R^2COOH$) or its anhydride with an alcohol $R^3OH$ wherein $R^3$ is as defined above. Examples of useful alcohols include methyl alcohol, ethyl alcohol, amyl alcohol, octyl alcohol, isooctyl alcohol, decyl alcohol, isodecyl alcohol, tridecyl alcohol, octadecyl alcohol, etc.

The hydroxy compound reacted with the carboxylic acid or anhydride also may be characterized by the formula $HOR^4CN$ wherein $R^4$ is a hydrocarbylene group. Specific examples of such hydroxy-containing compounds include 2-cyanoethanol, 2-cyano-1-propanol, etc. Examples of hydroxy compounds characterized by the formula $HOR^4NO_2$ which can be reacted with the acid or anhydride compounds include 2-nitro ethanol; 2-methyl-2-nitropropanol, 3-nitro-2-butanol; 2-nitro-1-propanol; 3-nitro-2-pentanol; etc. Examples of hydroxy compounds characterized by the formula $HOCH_2CF_3$ include 2,2,2-trifluoroethanol; 1,1,1-trifluoro-2-propanol; 2-trifluoromethyl-2-propanol; etc.

The carboxylic ester compounds of the present invention characterized Formulae I and II can be prepared by reacting a carboxylic acid ($R^2COOH$) or its anhydride with any of the above-described hydroxy-containing compounds. Generally, about equivalent amounts of the acid or anhydride and the hydroxy-containing compounds are utilized in the reaction which is a typical esterification reaction. Although no catalyst is required for the anhydrides, the esterification reaction with carboxylic acid generally is acid catalyzed. Typically, about 1% by weight of an acid catalyst such as a mineral acid or para-toluene sulfonic acid is utilized in the reaction mixture. The mixture is heated and stirred while removing water when the free acids are used and, optionally excess carboxylic acid. The reaction may be conducted in the presence of solvent such as hydrocarbon solvents including toluene, xylene, etc.

The following examples illustrate the preparation of the carboxylic esters useful in the present invention.

EXAMPLE 1

Into a reaction vessel there are charged 244 parts of Neodol 23-6.5, and the contents of the vessel are heated to 90° C. while blowing nitrogen through the liquid. Dropwise addition of 51 parts of acetic anhydride is begun, and the addition requires about 0.5 hour. An additional 5 parts of acetic anhydride are charged to the reaction mixture and the mixture is heated to 100° C. This procedure is repeated twice and the mixture is then maintained at about 100° C. for 2 hours whereupon the mixture is stripped to 135° C. at 30 mm.Hg. The residue is filtered through a mixture containing about 10 parts of filter aid and about 3 parts of calcium hydroxide. The filtrate is the desired product.

EXAMPLE 2

A mixture of 630 parts (1 equivalent) of Alfonic 1412-60, about 75 parts (about 1.0 equivalent) of formic acid, about 50 parts of toluene and 2 parts of para-toluene sulfonic acid is prepared and heated to 110° C. with stirring. Azeotropic water is collected over 8 hours, and the reaction mixture then is stripped to 100° C. The residue is filtered, and the filtrate is the desired ester.

EXAMPLE 3

A mixture of 133 parts (0.287 mole) of Alfonic 1012-60, 20 parts (0.33 mole) of acetic acid, about 50 parts of toluene and 5 parts of an acidified clay is prepared and heated to reflux. The mixture is maintained at the reflux temperature for about 12 hours. Sulfuric acid (2 parts) is added and the reaction is carried out for an additional 8 hours while removing water. The residue is filtered, and the filtrate is stripped at reduced pressure to yield a light amber oil which is the desired product.

EXAMPLE 4

Alfonic 1412-60 (127 parts, 0.25 mole) is charged to a reaction vessel, and 53 parts (0.26 mole) of trifluoroacetic acid are then added. An exothermic reaction results which raises the temperature to about 72° C. The mixture then is heated to about 110° C. for 1 hour and stripped under vacuum at 70° C. for about 1.5 hours. The residue is the desired product.

EXAMPLE 5

A mixture of 170 parts (2 moles) of cyanoacetic acid, 400 parts (2 moles) of tridecyl alcohol and 10 parts of a sulfuric acid treated clay is prepared, and the mixture is heated to about 150° C. Water is evolved very quickly and removed. The reaction mixture is cooled to 120° C. and maintained at this temperature for 6 hours. The product, after cooling, is filtered, and the filtrate is the desired product.

EXAMPLE 6

A mixture of 577 parts (1 mole) of SandoPan DTC (carboxylic acid of the general structure $R(OCH_2CH_2)_nOCH_2COOH$ where R is an aliphatic and n is an integer of from 1 to about 10), 119 parts (1 mole) of 2-methyl-2-nitropropanol and 10 parts of Amberlyst 15 catalyst is prepared and the temperature of the mixture is elevated. Water is evolved and removed from the reaction mixture. Maximum reaction temperature of 140° C. is attained as the water is removed. The residue is the desired product.

EXAMPLE 7

A mixture of 516 parts (3 moles) of decanoic acid and 357 parts (3 moles) of 2-methyl-2-nitropropanol is prepared, and the mixture is heated to about 150° C. Water is removed as it evolves. When all the water is removed, the reaction mixture is filtered, and the filtrate is the desired product.

Other esters of the type represented by Formulae I and II can be prepared by procedures similar to the procedures in Examples 1-5 involving the reaction of a carboxylic acid $R^2COOH$ and the hydroxy-containing compounds represented by Formulae III–VIII. Specific examples of acids and hydroxy-containing compounds which can be reacted to form the desired esters of this invention are illustrated in Table I.

TABLE I

| Example | $R^2COOH$ | Hydroxy Compound |
|---|---|---|
| 8 | $CH_3OCH_2COOH$ | $HOCH_2CN$ |
| 9 | $O_2NCH_2CH_2COOH$ | $HOCH_2CF_3$ |
| 10 | $HOCH_2COOH$ | $HOC(CH_3)_2CF_3$ |
| 11 | $HOCH(CH_3)COOH$ | $HOCH_2CH_2NO_2$ |
| 12 | $CH_3OCH_2COOH$ | Neodol 23-6.5 |
| 13 | $CF_3COOH$ | $HOCH_2CF_3$ |
| 14 | $HOCH_2COOH$ | Neodol 23-6.5 |

The organic lubricants characterized by Formulae I and II preferably are free of acetylenic and aromatic unsaturation. Some compounds of Formulae I and II which contain such unsaturation are insoluble in the fluorine-containing hydrocarbons and are, in particular, in 1,1,1,2-tetrafluoroethane. The soluble lubricants of this invention also are preferably free of olefinic unsaturation except that some olefinic unsaturation may be present so long as the lubricant is soluble.

The carboxylic ester lubricants are soluble in the fluorine-containing hydrocarbons and, in particular, in the fluorohydrocarbons such as 1,1,1,2-tetrafluoroethane. The lubricants are soluble over a wide temperature range and, in particular, at low temperatures. The solubility of the lubricants in fluorohydrocarbons such as 1,1,1,2-tetrafluoroethane at low temperatures is determined in the following manner. The lubricant (0.5 gram) is placed in a thick-walled glass vessel equipped with a removable pressure gauge. The tetrafluoroethane (4.5 grams) is condensed into the cooled ($-40°$ C.) glass vessel, and the contents are warmed to the desired temperature and mixed to determine if the lubricant is soluble in the tetrafluoroethane. If soluble, the temperature of the mixture is reduced until a separation and/or precipitate is observed. The results of this solubility test conducted with several examples of the carboxylic ester lubricants of the present invention are summarized in the following Table II.

TABLE II

| Liquid Containing Product of Example | Solubility °C. (ppt.) |
|---|---|
| 2 | $-15$ |
| 3 | $-20$ |
| 4 | $-20$ |
| 5 | $-15$ |

The liquid compositions of the present invention comprise a major amount of a fluorine-containing hydrocarbon and a minor amount of at least one soluble organic lubricant comprising at least one carboxylic ester of the types described above with respect to Formulae I and II. By "major amount" is meant an amount greater than 50% by weight such as 50.5%, 70%, 99%, etc. The term "minor amount" includes amounts less than 50% by weight such as 1%, 5%, 20%, 30% and up to 49.9%. In one embodiment, the liquid compositions of the present invention will comprise from about 70 to about 99% of the fluorine-containing hydrocarbon and from about 1 to about 30% by weight of the lubricant. In other embodiments, the liquid compositions of the present invention may contain from about 5 to about 20% by weight of the lubricant.

The liquid compositions of the present invention are characterized as having improved thermal and chemical stability over a wide temperature range. Other additives, if soluble in the liquid, known to be useful for improving the properties of halogen-containing hydrocarbon refrigerants can be included in the liquid compositions of the present invention to improve the characteristics of the liquid as a refrigerant. However, hydrocarbon oils such as mineral oil generally are not included in and are most often excluded from the liquid compositions of the invention, particularly when the fluorine-containing hydrocarbon contains no other halogen. Polyglycols and alkyl ethers which have been suggested in the prior art as useful solvents for fluorine-containing hydrocarbons are not required in the liquid compositions of the present invention and are generally omitted from the liquid compositions.

The additives which may be included in the liquid compositions of the present invention to enhance the performance of the liquids include extreme-pressure and anti-wear agents, oxidation and thermal-stability improvers, corrosion-inhibitors, viscosity-index improvers, pour point and/or floc point depressants, detergents, dispersants, anti-foaming agents, viscosity adjusters, etc. As noted above, these supplementary additives must be soluble in the liquid compositions of the invention. Included among the materials which may be used as extreme pressure and anti-wear agents are phosphates, phosphate esters, phosphites, thiophosphates such as zinc diorganodithiophosphates, dithiocarbamates, chlorinated waxes, sulfurized fats and olefins, organic lead compounds, fatty acids, molybdenum complexes, borates, halogen-substituted phosphorous compounds, sulfurized Diels Alder adducts, organic sulfides, metal salts of organic acids, etc. Stearically hindered phenols, aromatic amines, dithiophosphates, phosphites, sulfides and metal salts of dithioacids are useful examples of oxidation and thermal stability improvers. Compounds useful as corrosion-inhibitors include organic acids, organic amines, organic phosphates, organic alcohols, metal sulfonates, organic phosphites, etc. VI improvers include polyolefins such as polyesterbutene, polymethacrylate, polyalkyl styrenes, etc. Pour point and floc point depressants include polymethacrylates, ethylenevinyl acetate copolymers, succinamic acid-olefin copolymers, ethylene-alpha olefin copolymers, etc. Detergents include sulfonates, long-chain alkyl-substituted aromatic sulfonic acids, phosphonates, phenylates, metal salts of alkyl phenols, alkyl phenol-aldehyde condensation products, metal salts of substituted salicylates, etc. Silicone polymers are a well known type of antifoam agent. Viscosity adjusters are exemplified by polyisobutylene, polymethacrylates, polyalkyl styrenes, naphthenic oils, alkyl benzene oils, polyesters, polyvinyl chloride, polyphosphates, etc.

The liquid compositions of the present invention are particularly useful as refrigerants in various refrigeration systems which are compression-type systems such as refrigerators, freezers, and air-conditioners including automotive, home and industrial air-conditioners. The following examples are illustrative of the liquid compositions of the present invention.

|  | Parts by Wt. |
|---|---|
| Example A |  |
| 1,1,1,2-tetrafluoroethane (R134a) | 90 |
| Lubricant of Example 2 | 10 |
| Example B |  |
| 1,1,2,2-tetrafluoroethane | 85 |
| Lubricant of Example 4 | 15 |
| Example C |  |
| R-134a | 95 |
| Lubricant of Example 5 | 5 |
| Example D |  |
| R134a | 80 |
| Product of Example 1 | 20 |
| Example E |  |
| R134a | 85 |
| Product of Example 4 | 15 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A liquid composition comprising
(A) a major amount of a fluorine containing hydrocarbon containing one or two carbon atoms, and
(B) a minor amount of a soluble organic lubricant comprising at least one carboxylic ester compound represented by one of the formulae $$RO(R^1O)_nC(O)R^2 \quad \text{(I)}$$

and $$R^3OC(O)R^2 \quad \text{(II)}$$

wherein R is a hydrocarbyl group of at least 2 carbon atoms, provided that when $R^2$ is H or hydrocarbyl, R contains at least 6 carbon atoms,
$R^1$ is a hydrocarbylene group,
$R^2$ is H, hydrocarbyl, $-CF_3$, $-R^4CN$, $-R^4-NO_2$, or $R^5OCH(R^6)-$,
$R^3$ is a $-R^4CF_3$, $-R^4CN$ or $-R^4NO_2$ group, provided that $R^3$ is a hydrocarbyl group when $R^2$ is $-R^4CN$,
n is an integer from 1 to about 50,
$R^4$ is a hydrocarbylene group,
$R^5$ is H, a lower hydrocarbyl group or $R^7C(O)-$ where $R^7$ is a hydrocarbyl group, and
$R^6$ is H or a lower hydrocarbyl group.

2. The liquid composition of claim 1 wherein fluorine is the only halogen in the fluorine-containing hydrocarbon (A).

3. The liquid composition of claim 1 wherein the fluorine-containing hydrocarbon (A) is 1,1,1,2-tetrafluoroethane.

4. The liquid composition of claim 1 comprising from about 70 to about 99% by weight of the fluorine-containing hydrocarbon (A) and from about 1 to about 30% by weight of the soluble organic lubricant (B).

5. The liquid composition of claim 1 wherein the lubricant (B) is characterized by Formula II.

6. A liquid composition comprising
(A) from about 70 to about 99% by weight of a fluorohydrocarbon containing two carbon atoms, and
(B) from about 1 to about 30% by weight of a soluble organic lubricant comprising at least one carboxylic ester compound represented by one of the formulae $$RO(R^1O)_nC(O)R^2 \quad \text{(I)}$$

and $$R^3OC(O)R^2 \quad \text{(II)}$$

wherein R is a hydrocarbyl group containing from 2 to about 50 carbon atoms, provided that when $R^2$ is H or hydrocarbyl, R contains at least 6 carbon atoms,
$R^1$ is a hydrocarbylene group containing from 1 to about 7 carbon atoms,
$R^2$ is H, hydrocarbyl, $-CF_3$, $-R^4CN$, $-R^4-NO_2$, or $R^5OCH(R^6)-$,
$R^3$ is a $-R^4CF_3$, $-R^4CN$ or $-R^4NO_2$ group, provided that $R^3$ is a hydrocarbyl group when $R^2$ is $-R^4CN$, n is an integer from 1 to about 50, $R^4$ is a hydrocarbylene group containing from 1 to about 20 carbon atoms, $R^5$ is H, a lower hydrocarbyl group or $R^7C(O)$- where $R^7$ is a hydrocarbyl group, and $R^6$ is H or a lower alkyl group.

7. The liquid composition of claim 6 wherein the fluorohydrocarbon (A) is 1,1,1,2-tetrafluoroethane.

8. The liquid composition of claim 6 wherein the lubricant (B) is characterized by Formula I and $R^2$ is an alkyl group containing from 1 to about 20 carbon atoms.

9. The liquid composition of claim 6 wherein the lubricant is characterized by Formula I and $R^2$ is characterized by the formula $R^5OCH_2$- wherein $R^5$ is a lower alkyl group, or $R^7C(O)$- where $R^7$ is a lower alkyl group.

10. The liquid composition of claim 6 wherein the lubricant is characterized by Formula I and $R^2$ is $-CF_3$.

11. The liquid composition of claim 6 wherein the lubricant (B) is characterized by Formula II.

12. The liquid composition of claim 11 wherein $R^2$ is H or a lower alkyl group.

13. The liquid composition of claim 11 wherein $R^2$ is $-R^4CN$ and $R^3$ is a hydrocarbyl group containing from 1 to about 20 carbon atoms.

14. The liquid composition of claim 6 wherein the lubricant is free of acetylenic and aromatic unsaturation.

15. A liquid composition comprising (A) from about 70 to about 99% by weight of 1,1,1,2-tetrafluoroethane, and (B) from about 1 to about 30% by weight of a soluble organic lubricant free of acetylenic and aromatic unsaturation and comprising at least one carboxylic ester compound represented by the formula $$RO(R^1O)_nC(O)R^2 \qquad (I)$$

wherein R is a hydrocarbyl group containing from 2 to about 20 carbon atoms, provided that when $R^2$ is H or hydrocarbyl, R contains at least 6 carbon atoms, $R^1$ is an alkylene group containing from 1 to about 3 carbon atoms, $R^2$ is hydrogen, a lower alkyl group, an alkoxy methylene group, or $-R^4CN$, wherein $R^4$ is an alkylene group containing from 1 to about 20 carbon atoms, and n is an integer of 1 to about 20.

16. The liquid composition of claim 15 wherein $R^2$ is H or a lower alkyl group.

17. The liquid composition of claim 15 wherein $R^2$ is $-CF_3$.

18. The liquid composition of claim 15 wherein $R^1$ is a methylene or ethylene group.

19. The liquid composition of claim 15 wherein at least one of the hydrocarbyl group R or the hydrocarbylene group $R^1$ are branched-chain alkyl groups or branched-chain alkylene groups.

20. A liquid composition comprising (A) from about 70% to about 99% by weight of 1,1,1,2-tetrafluoroethane, and (B) from about 1 to about 30% by weight of at least one carboxylic ester compound, characterized by the formula $$R^3OC(O)R^2 \qquad (II)$$

wherein $R^2$ is H, an alkyl group containing from 1 to 10 carbon atoms, a lower alkoxymethylene group, $-CF_3$, $-R^4NO_2$, $R^7C(O)OCH_2$-, or $-R^4CN$, and $R^3$ is a $-R^4CF_3$, $-R^4CN$ or $-R^4NO_2$ group wherein $R^4$ is an alkylene group containing from 1 to about 10 carbon atoms, and $R^7$ is a hydrocarbyl group.

21. The liquid composition of claim 20 wherein $R^2$ is H or a lower alkyl group.

22. The liquid composition of claim 20 wherein $R^2$ is $CF_3$.

23. The liquid composition of claim 20 wherein $R^3$ is $-R^4CN$ or $-R^4NO_2$ wherein $R^4$ is a branched alkylene group.

24. The liquid composition of claim 20 wherein the alkyl group $R^2$ and the alkylene group $R^4$ are branched-chain alkyl or branched-chain alkylene groups.

25. The liquid composition of claim 1 wherein the hydrocarbyl group R in Formula I contains from about 14 to about 24 carbon atoms.

26. The liquid composition of claim 6 wherein the hydrocarbyl group R in Formula I contains from about 14 to about 24 carbon atoms.

27. The liquid composition of claim 15 wherein the hydrocarbyl group R in Formula I contains from about 14 to about 24 carbon atoms.

28. The liquid composition of claim 1 wherein n is an integer of at least about 3.

29. The liquid composition of claim 6 wherein n is an integer of at least about 3.

30. The liquid composition of claim 15 wherein n is an integer of at least about 3.

* * * * *